US006669881B2

(12) United States Patent
Saier

(10) Patent No.: US 6,669,881 B2
(45) Date of Patent: Dec. 30, 2003

(54) PROCESS FOR MAKING POROUS MOLDED BODIES OF THERMOPLASTIC POLYMERS

(75) Inventor: Hans-Dieter Saier, Remscheid (DE)

(73) Assignee: Microdyn Modulbau GmbH & Co. KG, Wuppertal (DE)

( * ) Notice: Subject to any disclaimer, the term of this patent is extended or adjusted under 35 U.S.C. 154(b) by 0 days.

(21) Appl. No.: 10/217,985

(22) Filed: Aug. 13, 2002

(65) Prior Publication Data

US 2003/0031857 A1 Feb. 13, 2003

Related U.S. Application Data

(62) Division of application No. 09/350,582, filed on Jul. 9, 1999, now abandoned, which is a continuation of application No. PCT/EP98/00063, filed on Jan. 8, 1998.

(51) Int. Cl.[7] .......................... B29B 11/06; B29B 11/14; B29C 35/00
(52) U.S. Cl. ....................................... 264/126; 264/122
(58) Field of Search ................................. 264/109–128

(56) References Cited

U.S. PATENT DOCUMENTS

| 3,674,722 A | * | 7/1972 | Rainer et al. ................. 521/88 |
| 4,247,498 A | | 1/1981 | Castro ......................... 264/41 |
| 4,294,707 A | | 10/1981 | Ikeda et al. .................. 210/782 |
| 4,594,207 A | | 6/1986 | Josefiak et al. .............. 264/41 |
| 4,735,626 A | * | 4/1988 | Smith et al. ................... 8/137 |
| 4,879,081 A | | 11/1989 | Keep ........................... 264/101 |
| 4,986,832 A | | 1/1991 | Kaneko et al. ................. 623/1 |
| 5,049,253 A | | 9/1991 | Izuo et al. .................... 204/301 |
| 5,250,240 A | | 10/1993 | Kim et al. ..................... 264/41 |
| 5,653,756 A | | 8/1997 | Clarke et al. .................. 623/11 |
| 5,690,739 A | | 11/1997 | Sassa et al. .................. 118/260 |
| 5,721,031 A | | 2/1998 | Echigo et al. ............. 428/36.4 |
| 5,728,298 A | | 3/1998 | Hamlin ........................ 210/491 |
| 5,804,074 A | | 9/1998 | Takiguchi et al. ..... 210/497.01 |
| 6,152,374 A | | 11/2000 | Moriyama et al. .......... 235/494 |
| 6,180,015 B1 | | 1/2001 | Egawa et al. ................ 210/767 |

FOREIGN PATENT DOCUMENTS

| DE | 26 57 943 B2 | 6/1978 |
| DE | 42 26 205 A1 | 2/1993 |
| DE | 44 34 670 A1 | 4/1996 |
| GB | 1 549 949 | 8/1979 |
| GB | 2 115 425 A | 9/1983 |

* cited by examiner

Primary Examiner—Stephen J. Lechert, Jr.
(74) Attorney, Agent, or Firm—Marshall, Gerstein & Borun LLP

(57) ABSTRACT

The manufacture of porous molded bodies by sintering of a mixture of powderous thermoplastic polymers and a liquid is described, the boiling point of the latter being at least equal to or higher than the sintering temperature. Sintering takes places in a mould, the process may be performed continuously and is suitable for the manufacture of porous molded bodies such as pipes, panels and the like which can be used as filter, gas distribution, air distribution, coalescing elements, as suction elements for oil, as carriers of active substances etc.

14 Claims, No Drawings

PROCESS FOR MAKING POROUS MOLDED BODIES OF THERMOPLASTIC POLYMERS

This is a division of application Ser. No. 09/350,582 filed Jul. 9, 1999 now abandoned, which is a continuation of International Patent Application No. PCT/EP98/00063 filed Jan. 8, 1998, the entire disclosure of which is incorporated herein by reference.

The invention relates to porous sintered moulded bodies made of thermoplastic polymers, a process for their manufacture and their use.

Porous moulded bodies made of thermoplastic polymers are frequently produced from solutions. Thus it is, for example, possible as described in DE-C2-3 205 289 to manufacture, in particular, porous membranes in that a polymer is heated in a special solvent mixture above its upper critical demixing temperature, the solution is cooled and the solvent is extracted.

The process there described which constitutes a further development of the so-called Accurel process disclosed in DE-OS 2 737 745, is rather unsuitable for the manufacture of more compact solid bodies. In particular, moulded bodies such as porous pipes can only be manufactured continuously with great difficulty. Likewise, the process for the manufacture of porous polyolefin membranes disclosed in DEC-2 4 226 205 is carried out with a molten phase, the phase separation being thermally induced.

Attempts have also already been made to process polymer powders of thermoplastic material by sintering. Thus, in U.S. Pat. No. 4,879,081 a process is described in which molecularly orientated thermoplastic material is comminuted; the particles are then subjected to a sintering process in order to obtain a material in which discrete particles having anisotropic properties are distributed. However, in the technology disclosed in that US patent specification, no porous moulded bodies are formed.

It is also known to sinter, e.g. under pressure, powders of thermoplastic polymers in a mould and to remove the moulded body after cooling form the mould. It is a drawback of this process that it can only be performed continuously with great difficulty, that only sinter elements of limited dimensions can be produced, e.g. having a length of approximately 1 m and that the pore size as well can only be controlled with great effort so that the reproducibility of the process leaves much to be desired.

In GB-PS 1 549 949 a process is described for the manufacture of open pore polymeric material, in which thermoplastic polymer in powder form is pressure moulded under pressure in the presence of an organic polar liquid having a boiling point of 5 to 20° C. above the softening temperature of the polymer; this structure is then heated at a heating rate of 20 to 190° C. per minute causing the liquid to escape in gas form and the formation of a directional pore structure having i.a. channel shaped pores. The formation of the directional pore structure may be further assisted by the presence of potassium bicarbonate which decomposes under such process conditions.

In DE-AS 2 657 943 a process for the manufacture of open-pore materials is described in which initially pulverulent polymer is pressure-moulded at a pressure of 10 to 250 kp/cm$^2$ in the presence of an organic liquid. The pressed body is thereafter heated causing the liquid to escape under boiling conditions and forms directional elongate pores. It is a drawback of this process that it is performed in two stages and relatively slowly, cannot be performed continuously and forms directional pores.

Although numerous processes are already known for the manufacture of porous moulded bodies, a demand nevertheless still exists for improved manufacturing processes which can provide economically sintered moulded bodies having good or improved properties and which can be adapted to a variety of applications.

A need has been recognised to make available a process which operates in a simple and reliable manner, by means of which porous moulded bodies of thermoplastic polymers can be provided in a reproducible manner with adjustable porosity and pore size, which can be performed continuously and which provides moulded bodies having valuable properties which can be applied in numerous manners, that, moreover, proceeds rapidly and essentially creates an isotropic structure.

The present invention provides a process for the manufacture of porous moulded bodies from thermoplastic polymers, wherein a mixture of pulverulent polymer and a liquid having a boiling temperature at least as high or higher than the sintering temperature, is introduced into a moulding apparatus, the mixture is sintered therein, optionally cooled, and the liquid is separated off.

The invention further provides moulded bodies, produced by the process having a porosity of 20 to 60% and a mean pore size of 0.2 to 50 micrometers and preferably having an outer diameter of 0.05 to 2.5 cm and an inner diameter of 0.03 to 2 cm, preferably composed of polyethylene.

The invention furthermore provides the use of the moulded bodies in the form of panels as support panels for filter cloths and filter membranes, as filter elements, a coalescing elements, as suction elements for free oils, as gas distribution or air distribution elements, as supports for the picking up or releasing of active substances, e.g. by slow release, e.g. for the taking up and release of insecticides, scent and fertilisers.

Pulverulent thermoplastic polymers are used for performing the process according to the invention. These are commercially available and may be obtained in a known manner, e.g. by precipitation from polymer solutions, by spraying or even by comminution of polymer material. The powders employed may be composed of a single polymer or even of polymer mixtures. The mean size of the powder particles may be within wide limits, e.g. may amount 2 to 300 micrometers, in particular, 2 to 80 micrometers. Preferably, powders having a mean particle size of 2 to 80 micrometers are used.

The polymer which, in particular, is present in a particle size of 2 to 65 micrometers is then mixed with the provided liquid or liquids. This may result in the formation of paste-formed or suspension-like mixtures depending on the selected mass ratios.

Suitable polymers include conventional thermoplastic, in particular synthetic polymers such as polyolefins, e.g. polyethylene, polypropylene, polymethylpentene etc. as well as corresponding copolymers, polycondensation polymers such as polyesters or polyamide 66 but also polyamide 6. Further thermoplastic polymers are listed in German published specification no. 2 737 745 which is hereby expressly cross-referred to. High molecular weight polyethylene is particularly suitable.

The liquid used or the liquid mixture used must not dissolve or practically not dissolve the polymer during mixing and during sintering. The boiling point of the liquid or of the liquid mixture is at least as high as the selected sintering temperature but is preferably higher than the sintering temperature, preferably at least 10°, in particular, 30° C. above the sintering temperature. The use of a liquid within the meaning of the invention is not counterindicated, even if the polymer/liquid mixture employed may be present at temperatures higher than the sintering temperature as a single or multiple phase liquid solution.

Besides organic liquids which under the sintering conditions are inert in relation to the polymer employed, i.e. do not attack it chemically or otherwise, such as e.g. natural oils, e.g. soya oil, castor oil or glycerine, polyglycols and the like, it is also possible to employ inorganic liquids. Thus, it is even possible to employ inorganic acids such as sulphuric acid according to the invention provided this does not attack the polymer under the sintering conditions.

The ratio of polymer/liquid can be set within wide limits and amounts preferably to 1:4 to 3:1. Preferably, the liquid content amounts to at least 30 percent by weight. It is important that sufficient liquid is present so as to embed or code the powder particles in order to ensure an optimal and uniform heating up of the sintering mixture. In a continuous manufacture the liquid in addition serves as a transporting aid.

By varying the ratio of polymer/liquid, the porosity and the pore size can be influenced. Thus, as the liquid content increases, the porosity increases. The pore size may be controlled by the selection of the particle size of the powder. The mechanical properties can be influenced by the selection of the liquids or by the employment of liquid mixtures having different mixing ratios.

The paste- or suspension-like mixture is then introduced into a moulding device, where appropriate after pre-heating to a temperature which preferably is several degrees below the sintering temperature. Such device may, for example, be a mould for the manufacture of panels or even a moulding tool including a jacket and mandrel for the manufacture of pipes. Sintering proceeds in the mould. In the course thereof an escape of the liquid should be prevented. This is e.g. made possible by sintering in a closed mould.

The sintering temperature depends on the melting point of the polymer used, but also on the duration of sintering; it should be sufficiently high for a bonding together of the polymer powder particles to take place. This causes adhesive bonding together of the particles to a greater or lesser extent in the regions of mutual contact. In the course thereof, a melting together in such regions of contact may also take place. Thus, in the event of very brief sintering periods as are possible with the process according to the invention, e.g. several seconds such as 10 to 20 seconds, it is even possible to sinter at the melting temperature. Such periods are so limited that complete melting and flowing together of the particles will not take place.

However, in particular, during relatively long sintering periods, the sintering temperature is slightly or even by several degrees below the melting point of the polymer used. Polyolefin powders are advantageously sintered at 160 to 210° C. The sintering together of the powders may be promoted by the simultaneous application of pressure.

After sintering in the mould, the moulded body emerges from the mould, optionally continuously or discontinuously, and is cooled, if desired or required, e.g. in the manufacture of pipes. These may then e.g. be immediately cut to the desired length; however, it is also possible to leave them initially in "endless" form and to coil them into coiled form.

The process may also be performed very advantageously continuously, e.g. in that the mixture of polymer/liquid is continuously fed to an elongate tool for the moulding of pipes and the sintering procedure is performed inside the tool. A pump means serving for conveying the mixture presses the latter through the device. The mandrel may be composed of glass and may jointly with the jacket form the pipe moulding passage. Heating takes place by way of the outer pipe. It may, however alternatively proceed by way of the inner pipe; but combined heating from inside and from outside is also possible. Appropriately, the moulded body is cooled even before leaving the elongate moulding tool. The moulding tool used may be subdivided into a plurality of temperature zones, e.g. a pre-heating zone, a sintering zone and a cooling zone. In this context, it is possible to operate with very short moulding tools, e.g. 20 to 30 cm long. The tube leaves the tool continuously and can be formed of any desired length.

Heating to the sintering temperature may proceed very rapidly, e.g. at rates of up to 600 to 1200° C./mm. Thus, for example, in the continuous manufacture of pipes it is possible to heat from 20° C. to 220° C. in the course of 10 seconds. During the sintering, the liquid used, e.g. an oil, does not boil, for which reason sintering proceeds under bubble-free conditions, an isotropic structure being formed, i.e. the pores have a non-directional structure and are distributed uniformly throughout the material. The mean pore diameter is generally in the range between 0.2 to 50 micrometers, preferably between 0.5 to 10 micrometers.

The liquid may be removed in a variety of manners, for example, by blowing out with a gas. Preferably, however, it is removed by extraction.

The structure and the properties of the sintered moulded bodies obtained can be controlled by adjusting the various process parameters. Thus, elasticity, rigidity, hardness, brittleness, abrasiveness, porosity and permeability may be influenced for a variety of substances, e.g. by the selection of the polymer and appropriate liquids as well as their relative mass ratios, the sintering temperature and the sintering duration, the pressure applied during sintering and the particle size of the powder employed as well as in appropriate circumstances by the addition of additives.

A great variety of moulded bodies may be produced according to the invention, e.g. panels, rods, tray-shaped bodies, pipes etc. The moulded bodies can be used in a multitude of manners and may, for example. be employed as supports for filter cloths or filter membranes as distributing bodies for liquids or gases as filtering materials for adsorption purposes etc.

Because of their excellent suction forces and absorption capabilities, it is possible, for example with the aid of pipes according to the invention, to remove oils from aqueous effluents. For this purpose, e.g. one or more pipes are placed e.g. vertically into the settling vessel so that the upper portion of the pipe is above the liquid level and the lower portion is connected with a discharge pipe system. The oil film which settles on the water draws itself so to speak into the pipes, the oil then being discharged by way of the pipes.

The moulded bodies according to the invention are also very suitable for the treatment of baths such as pickling baths and the like. A further field of employment is the use as coalescing element, e.g. for coalescing caustic soda in polycarbonate manufacture.

It was particularly surprising that according to the invention it was possible to produce sintered bodies of thermoplastic polymers having such excellent properties and that it now became possible even to manufacture moulded bodies having relatively large dimensions, e.g. pipes of optional length in a simple manner.

The process according to the invention may be performed in an economically very advantageous manner, can be readily controlled and yields reproducible results, which is of great advantage in a continuous operation. By variation of the individual process parameters such as type of polymer used, composition of polymer mixtures, sintering temperature and sintering duration, particle size of the powder, ratio of liquid/polymer powder, it becomes possible in a predetermined manner to obtain moulded bodies within a wide spectrum of properties and having excellent performance.

The moulded bodies are employable in a great variety of manners and exhibit very interesting properties from an application technological viewpoint.

Particularly when employing highly polymerised polyethylene it is possible to obtain porous moulded bodies having excellent chemical stability such as excellent oxidation resistance, resistance against hydrogen peroxide and resistance against chlorine.

The invention will be further elucidated with reference to the following examples.

EXAMPLE 1

A mixture of 56 parts by weight of polyethylene GUR X 117 of the firm Hoechst AG, having a mean particle size of 65 micrometers and 44 parts by weight of a mixture of soya oil and castor oil (75:25 parts by volume) were introduced continuously by way of a conveyor apparatus into an elongate pipe moulding tool having a mandrel and jacket; the temperature of the tool amounted to 180° C. After leaving the mould, cooling took place followed by extraction with alcohol to remove the oil mixture. The pipe so produced is porous, the pore size determined by the blow point method was 3 micrometers.

EXAMPLE 2

A pipe was produced in the same manner as disclosed in example 1. However, instead at the mixture of soya oil/castor oil, soya oil alone was used as the mixture. The pipe obtained according to example 2 was characterised by a lower flexibility as compared with the pipe according to example 1.

EXAMPLE 3

A rod shaped moulded body which was porous and had the same pore size as the pipe in according with example 1 was produced in the same manner as in example 1, but using a tubular tool.

What is claimed is:

1. A process for making a molded body from thermoplastic polymers, comprising the steps of:
   (a) mixing a pulverulent polymer and a liquid to provide a mixture, wherein the pulverulent polymer has a mean particle size of 2 to 300 microns;
   (b) introducing the mixture into a molding apparatus;
   (c) sintering the mixture in said molding apparatus at a temperature and for a time period such that complete melting and fusion of the polymer is avoided;
   (d) optionally cooling the sintered mixture; and,
   (e) separating the liquid from the sintered mixture, wherein the liquid has a boiling temperature at least as high as the sintering temperature and wherein the polymer is substantially insoluble in the liquid during said mixing and sintering steps.

2. Process according to claim 1, wherein during sintering the escape of the liquid is avoided.

3. Process according to claim 2, wherein sintering is carried out in a mold which is sealed towards the outside.

4. Process according to claim 1, wherein a mixture of polymers is used.

5. Process according to claim 1, wherein a mixture of organic liquids is used.

6. Process according to claim 1, wherein polymers in powder form having a mean particle size of 2 to 175 micrometers are used.

7. Process according to claim 1, wherein polymers and liquids are employed in a mass ratio of 1:4 to 3:1 and the proportion of liquid amounts preferably to at least 30 percent by weight.

8. Process according to claim 1, wherein polyolefins are employed as the polymer.

9. Process according to claim 1, wherein polyolefins having a molecular weight of 300 000 to 10 000 000 dalton are used.

10. Process according to claim 1, wherein high boiling oils are used as the liquid.

11. Process according to claim 1, wherein the mixture of polymer and liquid is preheated prior to sintering.

12. Process according to claim 1, wherein molding and sintering are performed continuously.

13. Process according to claim 1, wherein the liquid after sintering is removed by extraction.

14. Process according to claim 1, wherein the liquid has a boiling temperature at least 10° C. higher than the sintering temperature.

* * * * *

UNITED STATES PATENT AND TRADEMARK OFFICE
CERTIFICATE OF CORRECTION

PATENT NO. : 6,669,881 B2
DATED : December 30, 2003
INVENTOR(S) : Hans-Dieter Saier It is certified that error appears in the above-identified patent and that said Letters Patent is hereby corrected as shown below:

<u>Title page,</u>
Item [30], please add -- Foreign Application Priority Data, Application No. 197 00 760.0, Germany, filed January 11, 1997. --

Signed and Sealed this

Twenty-fifth Day of May, 2004

JON W. DUDAS
*Acting Director of the United States Patent and Trademark Office*